Patented Dec. 4, 1923.

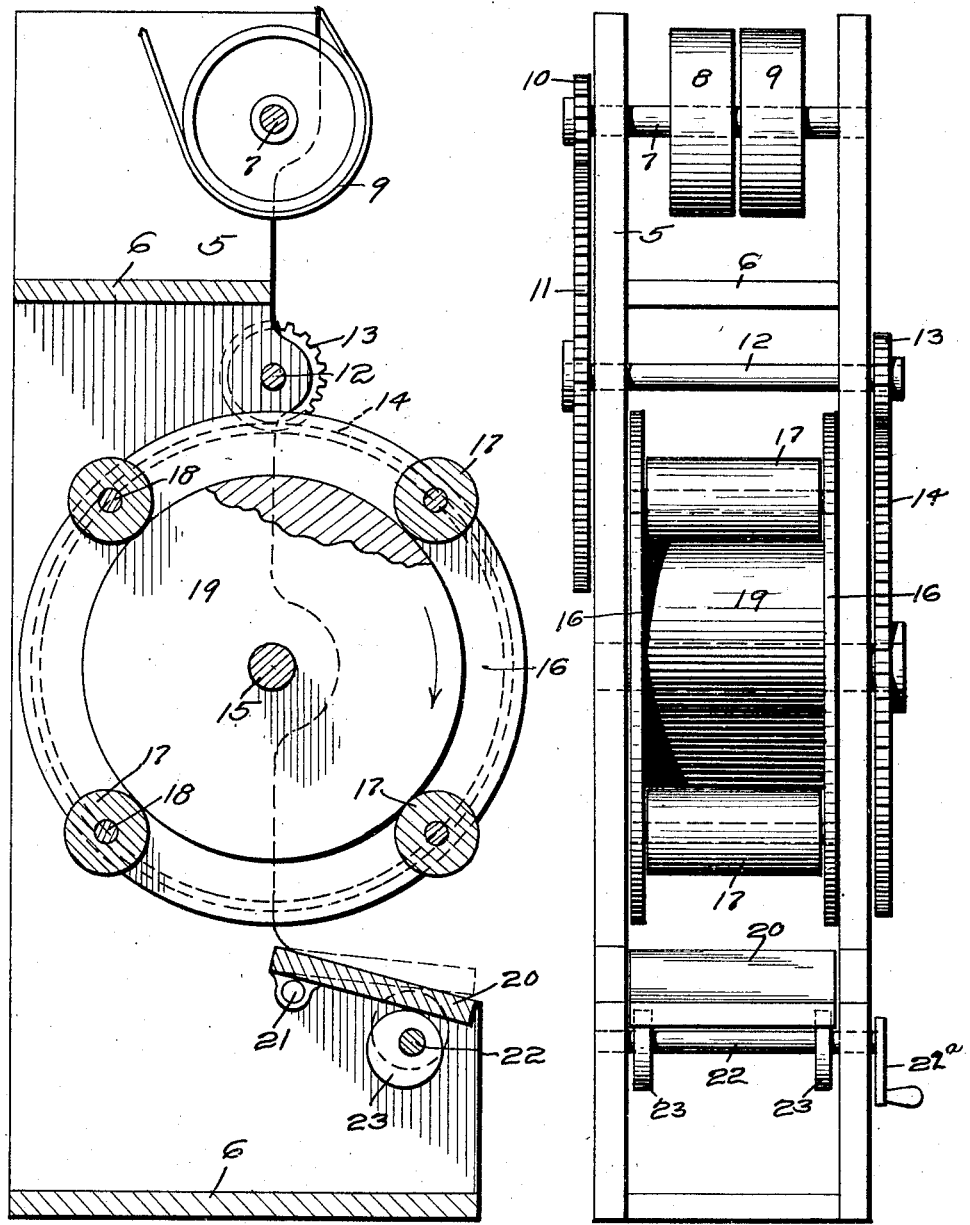

1,476,209

UNITED STATES PATENT OFFICE.

OLE O. MOEN, FINGER T. GRONVOLD, AND ALFRED M. CALL, OF RUGBY, NORTH DAKOTA.

PLOWSHARE SHARPENER.

Application filed July 6, 1922. Serial No. 573,208.

*To all whom it may concern:*

Be it known that OLE O. MOEN, FINGER T. GRONVOLD, and ALFRED M. CALL, citizens of the United States, residing at Rugby, in the county of Pierce and State of North Dakota, have invented certain new and useful Improvements in Plowshare Sharpeners, of which the following is a specification.

This invention relates to a plow share sharpening device and it has for its object to provide a machine constructed to roll the edge of the plow share to a sharp condition in contradistinction to grinding it away as is frequently done.

In the accompanying drawing:

Fig. 1 is a vertical sectional view of a plow share sharpening machine constructed in accordance with the invention; and Fig. 2 is a front elevation thereof.

The machine of the present invention comprises a side plate 5 and transverse walls 6. A power shaft 7 carrying fast and loose pulleys 8 and 9 is mounted in these side plates and carries a pinion outwardly of one side plate which pinion meshes with a large gear wheel 11. The gear 11 is fast upon a transverse shaft 12 and this shaft at the end opposite the gear 11 carries a pinion 13 which meshes with a large gear 14 that is fast upon a transverse shaft 15. In other words, the construction is such as to provide a reducing gearing between the shafts 7 and 15, so that with the shaft 7 running at considerable speed and driven by any suitable type of motor, a slow but correspondingly powerful movement will be imparted to the shaft 15. The shaft 15 carries spaced discs 16. A plurality of rollers 17 is mounted upon shafts 18 which extend between and are supported by the discs 16 and move bodily therewith. The peripheries of the rollers 17 project beyond the peripheries of the discs 16. To relieve the strain upon the shafts 18 and to take the bodily thrust off the rollers 17 as they act to roll out the edge of the plow share, as presently set forth, a filling block 19 is mounted upon the shaft 15 and the inner portions of the rollers 17 bear upon the periphery of this filling block. An anvil plate 20 is pivoted at 21 between the side walls 5 and may be adjusted to varying inclinations by manipulation of a handle 22ª which is fast upon a shaft 22, said shaft carrying eccentrics 23 upon which the outer portion of the anvil plate 20 rests. The plow share to be sharpened is placed by the operator upon the anvil plate 20 with the edge to be sharpened disposed inwardly. As the rollers 17 travel around they engage the plow share, coming into contact with said share about two inches back of the edge and as these powerful and slow moving rollers move downwardly and inwardly with constantly decreasing clearance between their peripheries and the anvil plate, the metal of the plow share is rolled to a thin and sharp edge.

It is not to be understood that the entire length of the edge to be treated is rolled out at one stroke. Upon the contrary, the rollers 17 are made of such length that each roller rolls only a small part of the length of the plow share and then the plow share is shifted longitudinally to bring a fresh portion of the edge to be treated into the path of the succeeding roller 17.

It is to be understood that the invention is not limited to the precise construction set forth but that it includes within its purview whatever changes fairly come within either the terms or the spirit of the appended claims.

Having described our invention what we claim is:

1. A machine of the character described comprising a pair of spaced side plates, an anvil plate supported therebetween, means for adjusting the angle of said anvil plate, a pair of discs between the side plates and above the anvil, a plurality of rollers mounted between said discs, a power shaft mounted in said side plates and a train of reducing gearing between the power shaft and the discs, said rollers traveling over said anvil plate with constantly decreasing clearance.

2. A machine of the character described comprising a pair of spaced side plates, an anvil plate supported therebetween, means for adjusting the angle of said anvil plate, a pair of discs between the side plates and above the anvil, a circular filling block between the discs and of smaller diameter than said discs and rotating therewith, a plurality of rollers mounted between and supported from said discs and having their peripheries projecting beyond the peripheries of said discs and having their inner peripheries engaged with said filling block, a power shaft mounted in said side plate and a train of reducing gearing between the power shaft and the discs, said rollers traveling over said anvil plate with constantly decreasing clearance.

In testimony whereof they affix their signatures in the presence of two witnesses.

OLE O. MOEN.
FINGER T. GRONVOLD.
ALFRED M. CALL.

Witnesses:
PAUL GOLDADE,
BALSER SCHIFF.